United States Patent
Jun et al.

(10) Patent No.: US 7,027,638 B2
(45) Date of Patent: Apr. 11, 2006

(54) WAFER COLOR VARIATION CORRECTING METHOD, SELECTIVE WAFER DEFECT DETECTING METHOD, AND COMPUTER READABLE RECORDING MEDIA FOR THE SAME

(75) Inventors: Chung-sam Jun, Suwon (KR); Sang-mun Chon, Sungnam (KR); Hyoung-jin Kim, Suwon (KR); Dong-chun Lee, Kyungki-do (KR); Sang-bong Choi, Suwon (KR); Sung-gon Ryu, Suwon (KR)

(73) Assignee: Samsung Electronics Co., Ltd., (KR)

(*) Notice: Subject to any disclaimer, the term of this patent is extended or adjusted under 35 U.S.C. 154(b) by 711 days.

(21) Appl. No.: 09/949,111

(22) Filed: Sep. 7, 2001

(65) Prior Publication Data

US 2002/0172412 A1 Nov. 21, 2002

(30) Foreign Application Priority Data

May 10, 2001 (KR) .............................. 2001-25578

(51) Int. Cl.
*G06K 9/00* (2006.01)

(52) U.S. Cl. ...................... 382/149; 382/167; 358/518; 348/87; 700/110; 438/16; 250/306

(58) Field of Classification Search ................ 382/167, 382/141–152; 358/518–523; 348/86–95; 700/110, 95; 438/16; 250/306–311
See application file for complete search history.

(56) References Cited

U.S. PATENT DOCUMENTS

| | | | | |
|---|---|---|---|---|
| 5,293,538 A | | 3/1994 | Iwata et al. | ................... 356/237 |
| 5,355,212 A | * | 10/1994 | Wells et al. | .............. 356/237.4 |
| 5,436,979 A | * | 7/1995 | Gray et al. | .................. 382/141 |
| 5,537,669 A | * | 7/1996 | Evans et al. | ................. 382/141 |
| 6,005,966 A | * | 12/1999 | Scaman | ....................... 382/149 |
| 6,021,214 A | * | 2/2000 | Evans et al. | ................. 382/141 |
| 6,027,201 A | * | 2/2000 | Edge | ............................. 347/19 |
| 6,075,905 A | * | 6/2000 | Herman et al. | ............. 382/284 |
| 6,169,282 B1 | * | 1/2001 | Maeda et al. | ................ 250/310 |
| 6,605,478 B1 | * | 8/2003 | Pnueli et al. | .................. 438/14 |
| 6,665,432 B1 | * | 12/2003 | Evans et al. | ................. 382/141 |
| 2003/0228045 A1 | * | 12/2003 | Asai et al. | ................... 382/141 |

FOREIGN PATENT DOCUMENTS

| | | |
|---|---|---|
| JP | 6021165 | 1/1994 |
| JP | 10135287 | 8/1998 |
| JP | 4259849 | 9/1998 |

* cited by examiner

*Primary Examiner*—Bhavesh M. Mehta
*Assistant Examiner*—Aaron Carter
(74) *Attorney, Agent, or Firm*—Mills & Onello, LLP

(57) ABSTRACT

A method for correcting color variations on the surface of a wafer, a method for selectively detecting a defect from different patterns, and computer readable recording media for the same are provided. Color variations in images of different parts of a wafer can be corrected using the mean and standard deviation of grey level values for the pixels forming each of the different parts of the wafer. In addition, different threshold values are applied to metal interconnect patterns and spaces of the wafer so that a defect can be selectively detected from the different patterns. Thus, a bridge known as a fatal, or killing defect to a semiconductor device can be detected without also falsely detecting grains as fatal defects. Due to increased defect screening capacity of the methods, the defect detecting method can be further efficiently managed.

18 Claims, 7 Drawing Sheets

WAFER COLOR VARIATION CORRECTING METHOD, SELECTIVE WAFER DEFECT DETECTING METHOD, AND COMPUTER READABLE RECORDING MEDIA FOR THE SAME

BACKGROUND OF THE INVENTION

1. Field of the Invention

The present invention relates to a technique for detecting defects occurring in the manufacture of a semiconductor device, and more particularly, to a method for correcting color variations on the surface of a wafer, a method for selectively detecting defects from different patterns of the wafer, and computer readable recording media for the same.

2. Description of the Related Art

Defects occurring in the manufacture of a semiconductor device greatly affect the reliability and yield of the device, so defect detecting methods are performed at every step of the manufacturing process. According to a general defect detecting method, corresponding pixels of images taken of a wafer in which patterns are repeatedly formed are compared and a pixel having a grey level difference greater than or equal to a threshold value is determined as a defect. Grey level is a measure of brightness on a scale between 0 and 255, where 0 is the dark end of the scale and 255 is the light end of the scale.

A conventional defect detecting method will now be described in greater detail. A wafer surface is irradiated with a light beam emitted from an arbitrary light source. A signal detecting part of a defect detecting apparatus detects light reflected from the wafer surface in pixel units. A grey level value for each of the pixels is determined. A threshold value is set as a reference for defect detection.

For defect detection, the images of three neighboring parts of the wafer surface are compared. Each of the images includes a plurality of pixels. Image B located between Images A and C is a candidate image on which a defect test is to be conducted. Images A and C are reference images serving as a reference for comparison. First, corresponding pixels of Images B and A are compared and grey level differences between the corresponding pixels are calculated. The pixels of Image B that have a grey level difference greater than or equal to a threshold value are identified. Next, corresponding pixels of Images B and C are compared and grey level differences between the corresponding pixels are calculated. The pixels of Image B that have a grey level difference greater than or equal to the threshold value are identified. Only common pixels identified in both comparisons are considered as defects. The most serious problem in the defect detecting method using the above-described image comparison is associated with a metal interconnect process.

Figure 1:
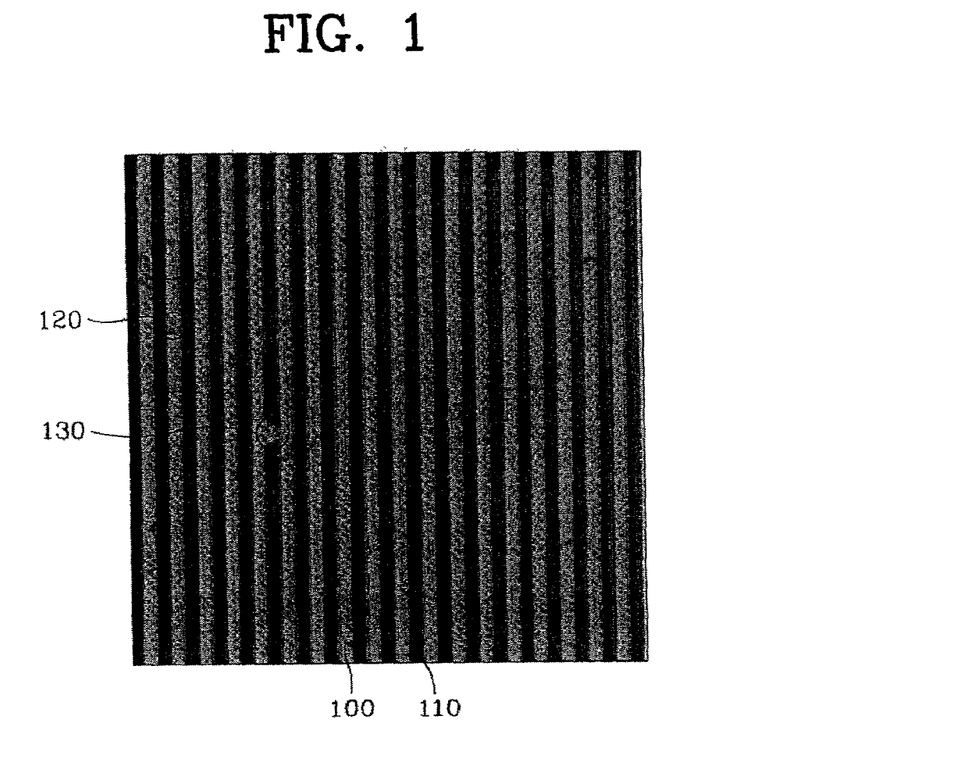
FIG. 1 is a photograph of metal line patterns of a wafer having grain and bridge defects.

FIG. 1 is a photograph of an actual wafer in which metal line patterns 100 and spaces 110 are regularly arranged. As shown in FIG. 1, grains 120 exist in the metal line patterns 100 and a bridge 130 exists in a space 110. Although the grains 120 appear as defects, the grains 120 do not affect the operation of the semiconductor device. However, as shown in FIG. 1, the grains 120 have a grey level value smaller than that of the metal line patterns 110. Thus, in a defect test, the grains 120 are recognized as defects, increasing the total number of defects. As a result, overall process management is adversely affected by the determination of grains as defects.

Figure 2:
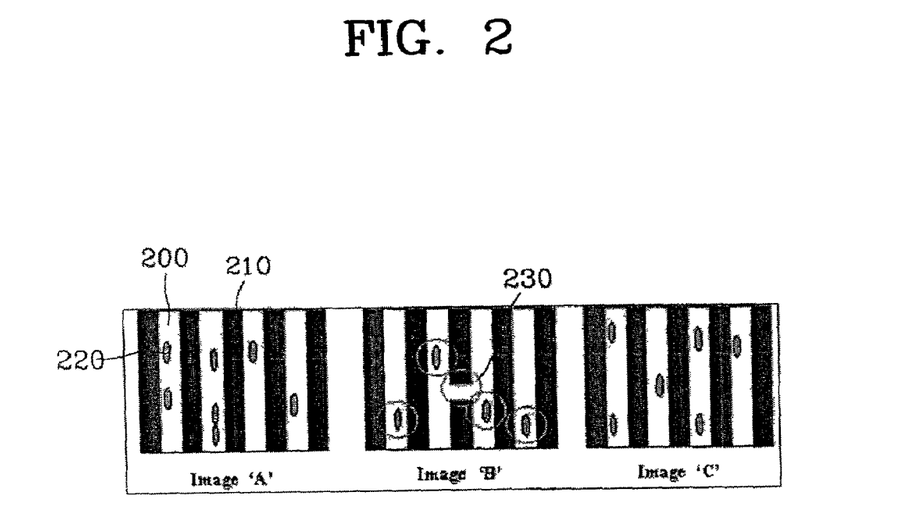
FIG. 2 illustrates defect detection by an image comparison method.

FIG. 2 is a diagram illustrating an image comparison method when a defect exists in a semiconductor wafer in which metal line patterns 200 and spaces 210 are regularly arranged. In Image B, a bridge 230, which is a fatal defect that seriously affects the yield of semiconductor device, and grains 220 exist. To detect a fatal defect such as the bridge 230, there is a need to increase the sensitivity of the test by reducing the threshold value. However, when the threshold value is set to too small of a value, the grains 220 are also detected as defects, falsely increasing the number of defects. As a result, process management becomes difficult. In contrast, when the threshold value is set to a large value to reduce the sensitivity so that the grains 220 are not detected as defects, there is a problem in that the fatally defective bridge 230 is also not detected.

Figure 3:
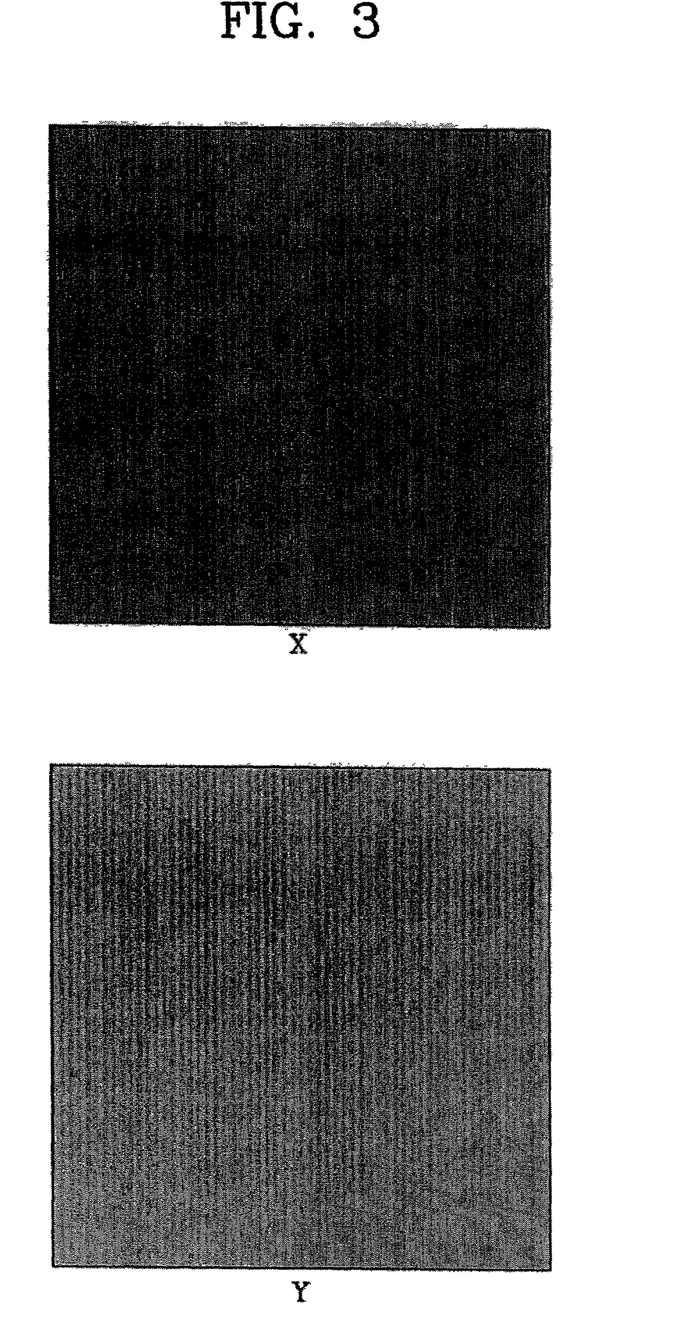
FIG. 3 shows two images taken of a wafer having color variations.

Meanwhile, another problem of the image comparison method occurs when a wafer being tested has color variations, i.e., when the images of two different parts, e.g., the center and edge, of the wafer have a grey level difference. In FIG. 3, image X represents a relatively dark image taken of the center of the wafer, and image Y represents a relatively bright image taken of the edge of the wafer.

Figure 4A:
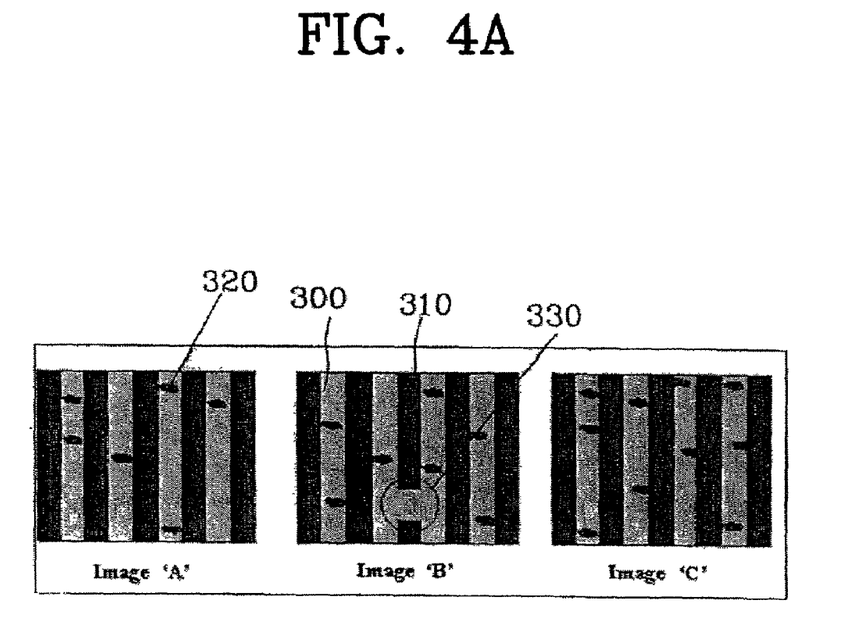
FIGS. 4A and 4B illustrate an image comparison method in the case where the surface of a wafer has color variations.
Figure 4B:
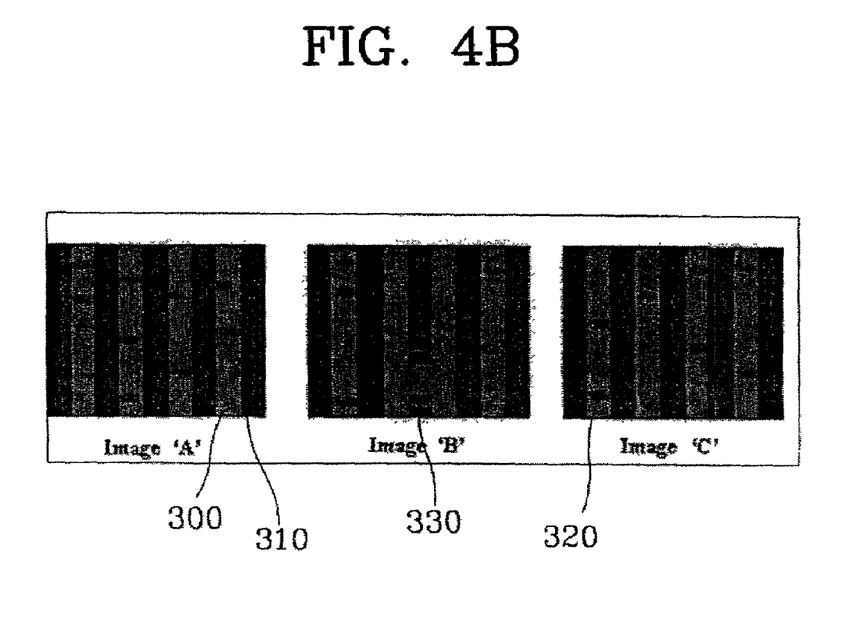

FIGS. 4A and 4B illustrate a defect detecting method using the image comparison method when a wafer has color variations. For a bright image shown in FIG. 4A, the threshold value for defect detection must be set high to detect fewer grains 320, while at the same time, to detect the bridge 330. If the threshold value set based on the bright image is applied to a dark image, as shown in FIG. 4B, there is a problem in that the sensitivity of the defect detection is reduced. In contrast, if the threshold value is set based on the dark image, as shown in FIG. 4B, the grains 320 are also detected in the bright image, as shown in FIG. 4A, so there is a problem in that too many defects are detected.

SUMMARY OF THE INVENTION

To solve the above-described problems, it is a first object of the present invention to provide a method for correcting color variations in a wafer and a computer readable recording medium for the same.

It is a second object of the present invention to provide a method for selectively detecting a defect from line and space patterns of a wafer, in which grains existing in the line patterns are not detected and a bridge existing in the space is detected, and a computer readable recording medium for the same.

It is a third object of the present invention to provide a method for selectively detecting only a bridge defect in space patterns and not grains in line patterns of a wafer in a metal interconnect process, in which a grey level difference between neighboring images of the wafer having color variations can be corrected, and a computer readable recording medium for the same.

To achieve the first object of the present invention, there is provided a color variation correcting method comprising dividing images of the surface of a wafer having an X region having a first color value and a Y region having a second color value into pixels having a predetermined size. A grey level value for each of the pixels is determined. The mean and standard deviation of grey level values for the pixels in each of the X and Y regions are calculated. The grey level value for each of the pixels in the X region is corrected such that the mean and standard deviation of the grey level values of the X region are equal to those of the Y region. Preferably, the grey level value for each of the pixels in the X region is corrected using the following formula, such that the mean and standard deviation of the grey level values of X region are equal to those of the Y region:

$$x'_i = \mu_Y + (x_i - \mu_X) \times \frac{\sigma_Y}{\sigma_X} \qquad (1)$$

where $x_i$ is the grey level value for each of pixels in the X region, $\mu$ is the mean grey level value of the pixels in corresponding regions, $\sigma$ is the standard deviation of grey level values for the pixels in corresponding regions, subscripts X and Y indicate X and Y regions, respectively, and $x_i'$ is the grey level value for each of the pixels in the X region after correction.

To achieve the second object of the present invention, there is provided a defect detecting method comprising dividing images of the surface of a wafer, in which a line pattern and a space having a smaller grey level than the line pattern are alternately and repeatedly arranged, into pixels having a predetermined size. A grey level value for each of the pixels is determined. A first threshold value for the line pattern and a second threshold value for the space are set. Pixels that have a grey level value greater than or equal to the threshold value for pixels of the line pattern and the second threshold value for pixels of the space are identified.

Here, to identify the pixels in the X region and Y region that have a grey level value greater than or equal to the first and second threshold value, preferably, the defect detecting method comprises extracting three successive images A, B, and C from the images of the surface of the wafer divided into pixels. The pixels of image B are compared with corresponding pixels of image A to calculate grey level differences between the corresponding pixels of images B and A. Pixels of image B that have a grey level difference, from the grey level value for the corresponding pixels of image A, greater than or equal to the first threshold value for pixels of the line pattern and greater than or equal to the second threshold value for pixels of the space are identified. The pixels of image B are compared with corresponding pixels of image C and grey level differences between the corresponding pixels of images B and C are calculated. Pixels of image B that have a grey level difference, from the grey level value of the corresponding pixel of image C compared in step (d), greater than or equal to the first threshold value for pixels of the line pattern and greater than or equal to the second threshold value for pixels of the space are identified. Finally, pixels of image B identified through the two comparisons as defective pixels.

It is preferable that the first threshold value is set so that grains existing in the metal interconnect pattern are not detected, and the second threshold value is set so that a bridge existing in the space is detected.

To achieve the third object of the present invention, the gray level value of a wafer surface having an X region and Y region having different color values is corrected into the gray level value of the Y region. Specifically, a grey level value for each of the pixels is corrected such that the mean and standard deviation of the gray level values of the X region are equal to those of Y region. Different threshold values are applied to line and space patterns to detect defects. A threshold value to be applied to the line pattern is set such that grains existing in the metal connect pattern are not detected, and a threshold value to be applied to the space is set such that a bridge is detected.

The color variation correcting and defect detecting methods described above can be implemented as computer readable recording media. A computer readable recording medium having embodied therein a computer program code unit for correcting color variations in a wafer, comprising: a program module for dividing images of the surface of the wafer having an X region having a first color value and an Y region having a second color value into pixels having a predetermined size; a program module for calculating the mean and standard deviation of grey level values of the pixels in each of the X and Y regions; and a program module for correcting the grey level value for each of the pixels in the X region such that the mean and standard deviation of the grey level values of the X region are equal to those of the Y region. Preferably, the program module for correcting the grey level value for each of the pixels in the X region uses the following formula, such that the mean and standard deviation of the grey level values of the X region are equal to those of the Y region:

$$x'_i = \mu_Y + (x_i - \mu_X) \times \frac{\sigma_Y}{\sigma_X} \qquad (1)$$

where $x_i$ is the grey level value for each of the pixels in the X region, $\mu$ is the mean grey level value of the pixels in corresponding regions, $\sigma$ is the standard deviation of grey level values for the pixels in corresponding regions, subscripts X and Y indicate X and Y regions, respectively, and $x_i'$ is the grey level value for each of the pixels in the X region after correction.

A computer readable recording medium having embodied therein a computer program code unit for detecting defects in a wafer, comprising: a program module for dividing images of the surface of the wafer, in which a line pattern and a space having a smaller grey level than the line pattern are alternately and repeatedly arranged, into pixels having a predetermined size; a program module for determining a grey level value for each of the pixels; a program module for setting a first threshold value for the line pattern and a second threshold value for the space; and a program module for identifying pixels that have a grey level value greater than or equal to the first threshold value for pixels of the line pattern and the second threshold value for pixels of the space. The defect detecting program code unit stored in the recording medium corrects the grey level value of images of the wafer surface including regions having different color values into the grey level value of images which is an optimal level, and detects defects by applying different threshold values to different patterns, i.e., line pattern and space in the wafer.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF PREFERRED EMBODIMENTS

The present invention now will be described more fully with reference to the accompanying drawings, in which preferred embodiments of the invention are shown. This invention may, however, be embodied in many different forms and should not be construed as being limited to the embodiments set forth herein.

Embodiment 1

This embodiment relates to a method for correcting color variations in the surface of a wafer. A color variation correction for two images corresponding to an X region having a first color value and a Y region having a second color value of a wafer will be described.

Figure 5:
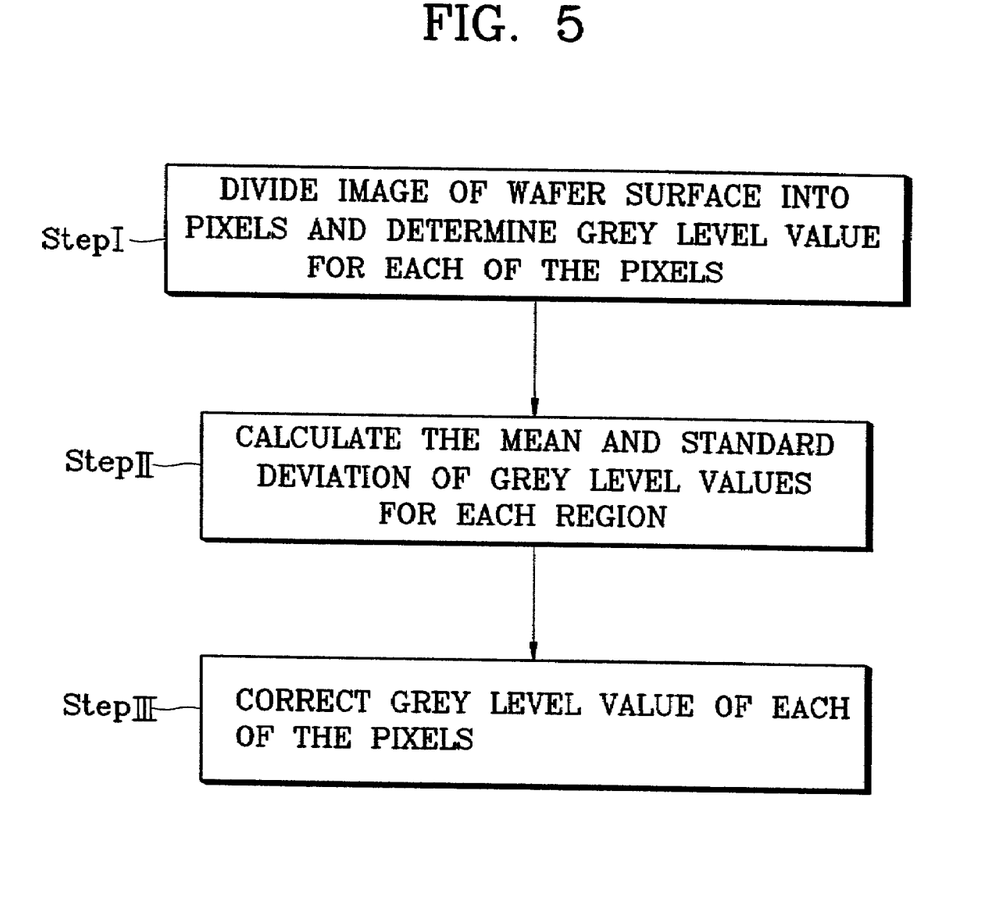
FIG. 5 is a flowchart illustrating a color variation correcting method according to the present invention.

FIG. 5 is a flowchart illustrating a color variation correcting method according to the present invention. In Step I, the image of a wafer surface having two regions, X (dark) region and Y (bright) region, which have different color values, is divided into pixels having a predetermined size. A grey level value for each of the pixels is determined. In Step II, the mean and standard deviation of the grey level values for the pixels in each of the two regions X and Y are calculated. In Step III, the grey level value of the X region having a smaller color value than the Y region is corrected according to the grey level value of the Y region. The grey level value for each of the pixels in the X region is corrected using formula (1):

$$x_i' = \mu_Y + (x_i - \mu_X) \times \frac{\sigma_Y}{\sigma_X} \qquad (1)$$

where $x_i$ is the grey level value for each of the pixels in the X region, $\mu$ is the mean grey level value of the pixels in corresponding regions, $\sigma$ is the standard deviation of all grey level values for the pixels for corresponding regions, subscripts X and Y indicate X and Y regions, respectively, and $x_i'$ is the grey level value for each of the pixels in the X region after correction.

Figure 6A:
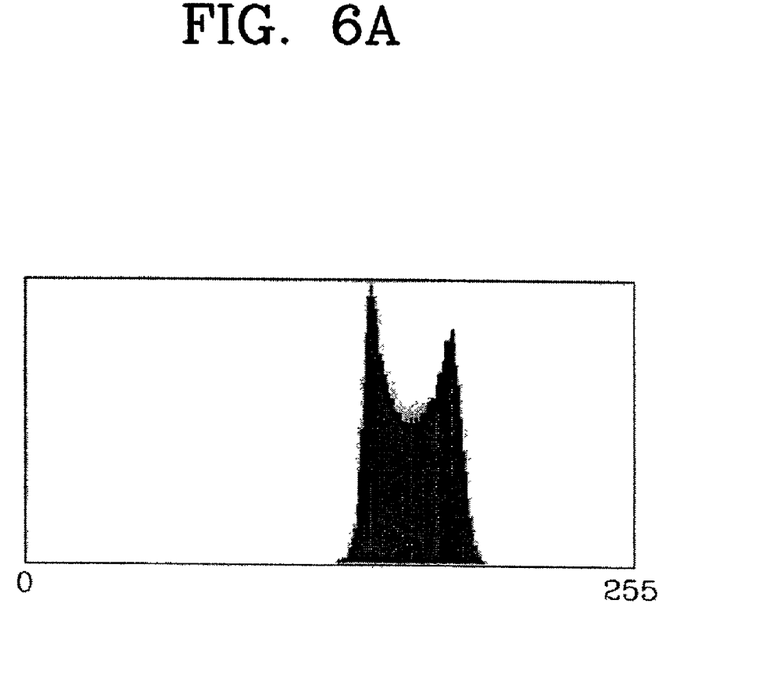
FIGS. 6A and 6B are histograms of the two images of FIG. 3 showing color variations.
Figure 6B:
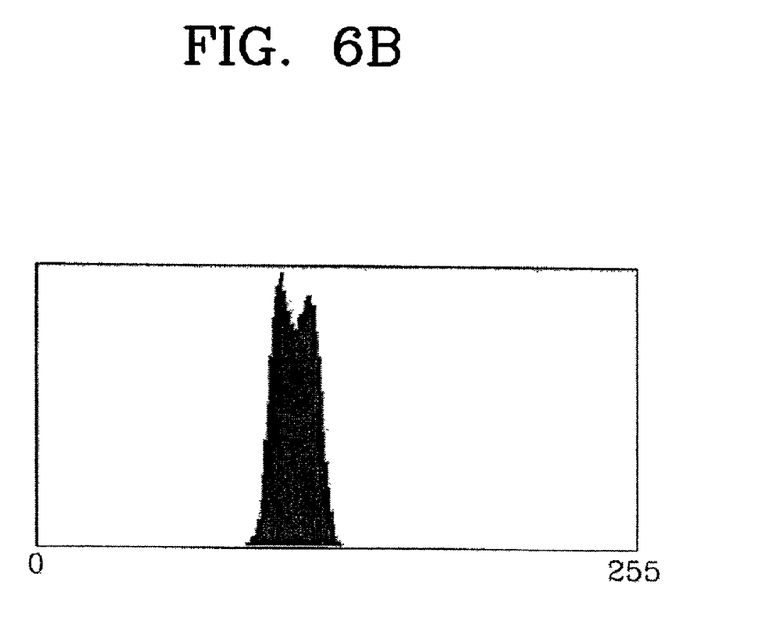

FIGS. 6A and 6B are histograms of the two images of the wafer of FIG. 3 having different color values. Here, the x-axis represents the scale of grey level values as integers from 0 to 255, and the y-axis represents the number of pixels having a corresponding grey level value. FIG. 6A is the histogram of the bright image Y of FIG. 3, and FIG. 6B is the histogram of the dark image X of FIG. 3. As shown in FIGS. 6A and 6B, due to a color value difference between the two images, the mean and standard deviation of the grey level values for the pixels in the two images differ from one another. In this embodiment, the histogram of FIG. 6B for the dark image X is corrected into the histogram of FIG. 6A using formula (1) above.

Embodiment 2

Figure 7:
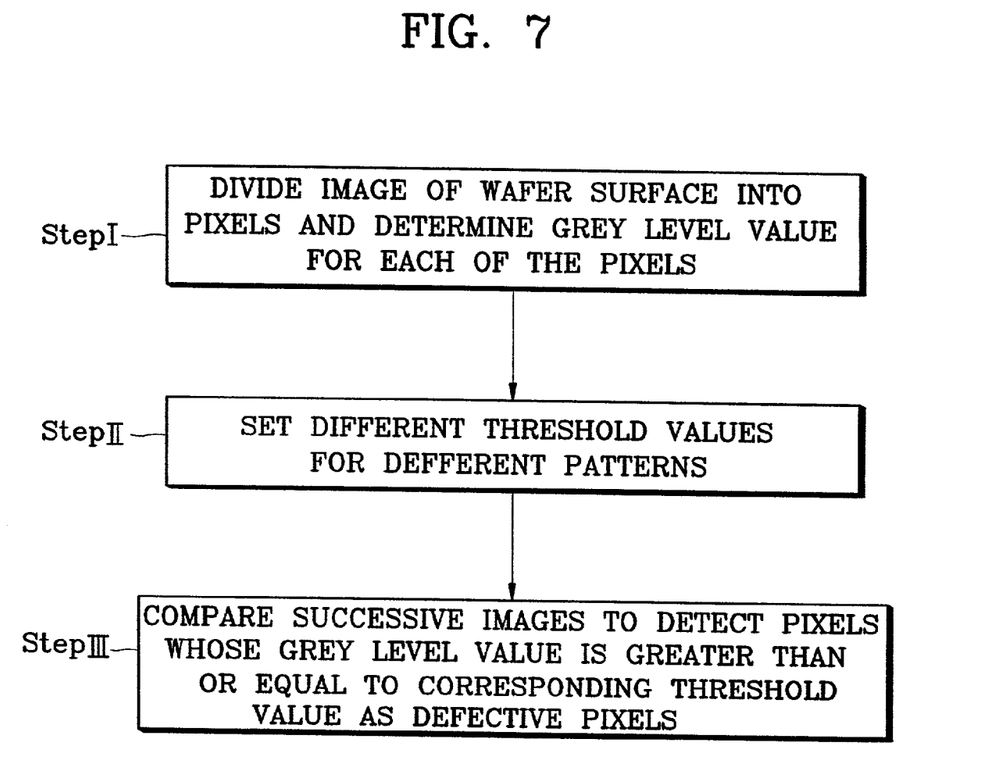
FIG. 7 is a flowchart illustrating a selective defect detecting method according to the present invention.

This embodiment relates to a method for selectively detecting defects in a metal interconnect pattern and a space which are alternately and repeatedly arranged in a wafer. FIG. 7 is a flowchart illustrating a selective defect detecting method according to the present invention. In Step I, the image of a wafer surface in which a metal interconnect pattern and a space between adjacent metal interconnect lines are alternately and repeatedly arranged is divided into pixels having a predetermined size. A grey level value for each of the pixels is determined. In Step II, a first threshold value is set for the metal interconnect pattern having a large grey level value to reduce sensitivity in detecting a defect in the metal interconnect pattern. A second threshold value, which is smaller than the first threshold value, is set for the space, having a relatively small grey level value, so as to increase sensitivity in detecting a defect in the space. In particular, so as not to detect grains existing in the metal interconnect pattern, the first threshold value is set to be larger than a grey level difference between the grains and the metal interconnect pattern. The second threshold value is set to be small enough to detect a bridge existing in the space.

In Step III, three successive images A, B, and C of the wafer are compared to detect defects. The metal interconnect pattern of one image is compared with a corresponding metal interconnect pattern of another image, and the space the one image is compared with a corresponding space of the other image. The pixels of the metal interconnect pattern have similar grey level values, and the pixels of the space have similar grey level values. However, the grey level difference is great between the pixels of the metal interconnect pattern and the space. Thus, the two patterns can be distinguished from one another by setting an arbitrary threshold value between the grey level values of the two patterns.

In particular, the pixels of the space of Image B are compared with the corresponding pixels of the corresponding space of Image A. Grey level differences between corresponding pixels are calculated. If the grey level difference of a particular pixel in Image B is greater than or equal to the second threshold value, that particular pixel in Image B is determined as a defect. Next, the pixels of the space of Image B are compared with the corresponding pixels of the corresponding space of Image C, and grey level differences between corresponding pixels are calculated. If the grey level difference of a particular pixel in Image B is greater than or equal to the second threshold value, that particular pixel in Image B is determined to be a defect. Here, a pixel in Image B that is determined as being a defect in both of the two comparisons is considered to be associated with a defect.

In the above-described selective defect detecting method, the threshold value for the metal interconnect pattern is set to be large so that grains existing in the metal interconnect pattern are not detected and so that a defect in the space pattern, such as a bridge, can be detected.

Figure 8A:
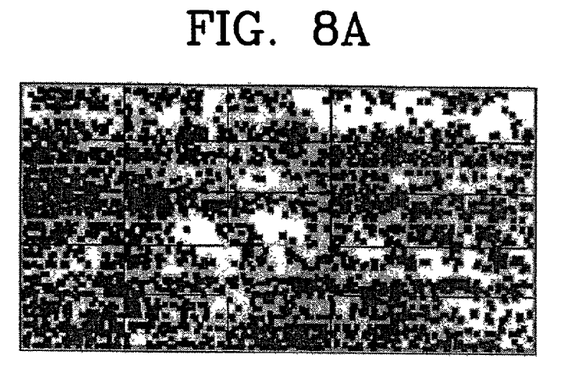
FIGS. 8A through 8C comparatively show the defect detection results obtained using a conventional method and the method according to the present invention for a wafer in an actual metal interconnect process, and show actual metal line patterns having a defect.
Figure 8B:
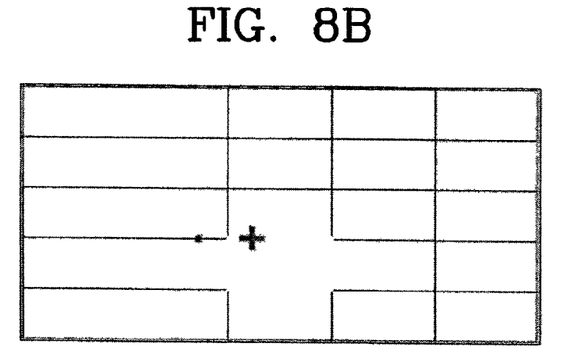
Figure 8C:
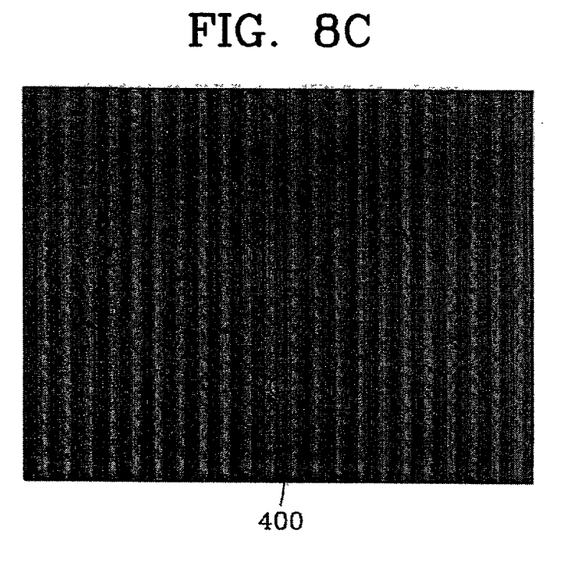

FIGS. 8A through 8C comparatively show defect detection results using a conventional method and the method according to the present invention applied to a wafer in a metal interconnect process. FIG. 8A shows the defect detection result obtained using a conventional method in which a common threshold value is applied to both the metal interconnect and space patterns. Black dots in the pixel image of FIG. 8A correspond to grains in the metal interconnect patterns determined as being defects. FIG. 8B shows the defect detection result obtained by the method according to the present invention. As shown in FIG. 8B, only a actual defect 400 such as a bridge, which is shown in FIG. 8C, is selectively detected by the method according to the present invention. In FIG. 8B, the black dot indicates the location of the bridge defect 400 shown in FIG. 8C. The cross (+) mark indicates the center of the wafer. Thus, false defect readings are avoided.

Embodiment 3

This embodiment relates to a pattern selective defect detecting method for a wafer having color variations. Here, this method is applied to the images of parts of the wafer having different color values. In this case, the same processes as described in Embodiments 1 and 2 are sequentially performed. Thus, descriptions of the processes of Embodiments 1 and 2 are not reproduced here.

As shown in FIGS. 3A and 3B, when both bright and dark images are obtained in a wafer, the color value of the dark image is corrected by the method described in Embodiment 1. Next, according to the method of Embodiment 2, different threshold values are applied to different types of patterns so that only a bridge is detected.

As described above, for the images of a wafer having different color values, the color value difference can be corrected using the mean and standard deviation of grey level values for the pixel in each image. In addition, different threshold values are selectively applied to the metal interconnect and space patterns so that a defect can be selectively detected from the metal interconnect pattern and space. That is, a bridge considered to be a fatal defect in a semiconductor device can be detected without false defect detection of grains. Due to increased defect screening capability of the method according to the present invention, the defect detection method can be further efficiently managed. Meanwhile, when there are color variations within a wafer, prior to application of the selective defect detection method, the color variations in the wafer are corrected to optimize the conditions for the selective defect detection method. As a result, the capacity to detect defects is improved.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method comprising:
dividing images of a surface of a wafer, in which a line pattern and a space between adjacent line patterns having a smaller grey level than the line pattern are alternately and repeatedly arranged, into first pixels having a predetermined size;
determining a first grey level value for each of the first pixels;
wherein when X and Y regions having different color values exist in the surface of the wafer, dividing images of the surface of a wafer having the X region of a first color value and the Y region of a second color value into second pixels having a predetermined size
determining a second grey level value for each of the second pixels in each of the X and Y regions;
calculating the mean and standard deviation of the second grey level values for the second pixels in each of the X and Y regions;
correcting the second grey level value for each of the second pixels in the X region such that the mean and standard deviation of the second grey level values of the X region are equal to those of the Y region;
setting a first threshold value for the line pattern and a second threshold value for the space; and
identifying first pixels that have a first grey level value greater than or equal to the first threshold value for first pixels of the line pattern and the second threshold value for first pixels of the space, wherein the first threshold value is set so that a grain existing in the line pattern is not detected, and the second threshold value is set so that a bridge existing in the space is detected.

2. The method of claim 1, wherein the second grey level value for each of the second pixels in the X region is corrected according to the following formula, such that the mean and standard deviation of the second grey level values of X region are equal to those of the Y region:

$$x'_i = \mu_Y + (x_i - \mu_X) \times \frac{\sigma_Y}{\sigma_X} \qquad (1)$$

where $x_1$ is the second grey level value for each of the second pixels in the X region, $\mu$ is the mean grey level value of the second pixels in corresponding regions, $\sigma$ is the standard deviation of second grey level values for the second pixels in corresponding regions, subscripts X and Y indicate X and Y regions, respectively, and $x_i'$ is the grey level value for each of the second pixels in the X region after correction.

3. A defect detecting method comprising:
dividing images of a surface of a wafer, in which a line pattern and a space between adjacent line patterns having a smaller grey level than the line pattern are alternately and repeatedly arranged, into pixels having a predetermined size;
determining a grey level value for each of the pixels;
setting a first threshold value for the line pattern and a second threshold value for the space; and
identifying pixels that have a grey level value greater than or equal to the first threshold value for pixels of the line pattern and the second threshold value for pixels of the space, wherein the first threshold value is set so that a grain existing in the line pattern is not detected, and the second threshold value is set so that a bridge existing in the space is detected.

4. The defect detecting method of claim 3, wherein identifying the pixels in the line pattern and the space that have a grey level value greater than or equal to the first and second threshold values, respectively, comprises:
(a) extracting three successive images A, B, and C from the images of the surface of the wafer divided into pixels;
(b) comparing the pixels of image B with corresponding pixels of image A and calculating grey level differences between the corresponding pixels of images B and A;
(c) identifying pixels of image B that have a grey level difference, from the grey level value for the corresponding pixels of image A compared in step (b), greater than or equal to the first threshold value for pixels of the line pattern and greater than or equal to the second threshold value for pixels of the space;
(d) comparing the pixels of image B with corresponding pixels of image C and calculating grey level differences between the corresponding pixels of images B and C;
(e) identifying pixels of image B that have a grey level difference, from the grey level value of the corresponding pixel of image C compared in step (d), greater than or equal to the first threshold value for pixels of the line pattern and greater than or equal to the second threshold value for pixels of the space; and
(f) recognizing pixels identified in both steps (c) and (e) as defective pixels.

5. The defect detecting method of claim 3, wherein the line pattern is a metal interconnect pattern;

6. The defect detecting method of claim 3, wherein when X and Y regions having different color values exist in the surface of the wafer, the defect detecting method further comprises, after determining the grey level for each of the pixels and before setting the first and second threshold values:

dividing images of the surface of the wafer having the X region of a first color value and the Y region of a second color value into pixels having a predetermined size;

determining a grey level value for each of the pixels;

calculating the mean and standard deviation of grey level values for the pixels in each of the X and Y regions; and correcting the grey level value for each of the pixels in the X region such that the mean and standard deviation of the grey level values of the X region are equal to those of the Y region.

7. The defect detecting method of claim 6, wherein correcting the grey level value for each of the pixels in the X region is performed using the following formula, such that the mean and standard deviation of the grey level values of X region are equal to those of the Y region, so that color variations between the X and Y regions are corrected:

$$x'_i = \mu_Y + (x_i - \mu_X) \times \frac{\sigma_Y}{\sigma_X} \quad (1)$$

where $x_i$ is the grey level value for each of the pixels in the X region, $\mu$ is the mean grey level value of the pixels in corresponding regions, $\sigma$ is the standard deviation of grey level values for the pixels in corresponding regions, subscripts X and Y indicate X and Y regions, respectively, and $x_i'$ is the grey level value for each of the pixels in the X region after correction.

8. The defect detecting method of claim 6, wherein identifying the pixels in the X region and Y region that have a grey level value greater than or equal to the first and second threshold value comprises:

(a) extracting three successive images A, B, and C from the images of the surface of the wafer divided into pixels;

(b) comparing the pixels of image B with corresponding pixels of image A and calculating grey level differences between the, corresponding pixels of images B and A;

(c) identifying pixels of image B that have a grey level difference, from the grey level value of the corresponding pixel of Image A compared in step (b), greater than or equal to the first threshold value for pixels of the line pattern and greater than or equal to the second threshold value for pixels of the space;

(d) comparing the pixels of image B with corresponding pixels of image C and calculating grey level differences between the corresponding pixels of images B and C;

(e) identifying pixels of image B that have a grey level difference, from the grey level value for the corresponding pixels of image C compared in step (d), greater than or equal to the first threshold value for pixels of the line pattern and greater than or equal to the second threshold value for pixels of the space; and (f) recognizing pixels identified in both steps (c) and (e) as defective pixels.

9. The defect detecting method of claim 6, wherein the line pattern is a metal interconnect pattern.

10. A computer readable recording medium having embodied therein a computer program code unit for correcting color variations in a wafer and for detecting defects in a wafer, the computer program code unit comprising:

a program module for dividing images of the surface of a wafer, in which a line pattern and a space between adjacent line patterns having a smaller grey level than the line pattern are alternately and repeatedly arranged, into first pixels having a predetermined size;

a program module for determining a first grey level value for each of the first pixels;

a program module for dividing images of the surface of the wafer having an X region of a first color value and an Y region of a second color value into second pixels having a predetermined size;

a program module for determining a second grey level value for each of the second pixels in each of the X and Y regions;

a program module for calculating the mean and standard deviation of second grey level values of the second pixels in each of the X and Y regions;

a program module for correcting the second grey level value for each of the second pixels in the X region such that the mean and standard deviation of the second grey level values of the X region are equal to those of the Y region;

a program module for setting a first threshold value for the line pattern and a second threshold value for the space; and a program module for identifying first pixels that have a grey level value greater than or equal to the first threshold value for first pixels of the line pattern and the second threshold value for first pixels of the space, wherein the first threshold value is set so that a grain existing in the line pattern is not detected, and the second threshold value is set so that a bridge existing in the space is detected.

11. The computer readable recording medium of claim 10, wherein the program module for correcting the second grey level value for each of the second pixels in the X region uses the following formula, such that the mean and standard deviation of the second grey level values of the X region are equal to those of the Y region:

$$x'_i = \mu_Y + (x_i - \mu_X) \times \frac{\sigma_Y}{\sigma_X} \quad (1)$$

where $x_i$ is the second grey level value for each of the second pixels in the X region, $\mu$ is the mean grey level value of the second pixels in corresponding regions, $\sigma$ is the standard deviation of second grey level values for the second pixels in corresponding regions, subscripts X and Y indicate X and Y regions, respectively, and $x_i'$ is the grey level value for each of the second pixels in the X region after correction.

12. A computer readable recording medium having embodied therein a computer program code unit for detecting defects in a wafer, the computer program code unit comprising:

a program module for dividing images of the surface of the wafer, in which a line pattern and a space between adjacent line patterns having a smaller grey level than the line pattern are alternately and repeatedly arranged, into pixels having a predetermined size;

a program module for determining a grey level value for each of the pixels;

a program module for setting a first threshold value for the line pattern and a second threshold value for the space; and a program module for identifying pixels that have a grey level value greater than or equal to the first threshold value for pixels of the line pattern and the second threshold value for pixels of the space, wherein the first threshold value is set so that a grain existing in the line pattern is not detected, and the second threshold value is set so that a bridge existing in the space is detected.

13. The computer readable recording medium of claim 12, wherein the program module for identifying pixels that have a grey level value greater than or equal to the first threshold value for pixels of the line pattern and the second threshold value for pixels of the space comprises:

a subprogram module for dividing images of the surface of the wafer into a plurality of pixels;

a subprogram module for extracting three successive images A, B, and C from the images of the surface of the wafer divided into pixels;

a subprogram module for comparing the pixels of image B with corresponding pixels of image A and calculating grey level differences between the corresponding pixels of images B and A;

a subprogram module for identifying pixels of image B that have a grey level difference, from the grey level value for the corresponding pixels of image A compared with image B, greater than or equal to the first threshold value for pixels of the line pattern and greater than or equal to the second threshold value for pixels of the space;

a subprogram module for comparing the pixels of image B with corresponding pixels of image C and calculating grey level differences between the corresponding pixels of images B and C;

a subprogram module for identifying pixels of image B that have a grey level difference, from the grey level value for the corresponding pixels of image C compared with image B, greater than or equal to the first threshold value for pixels of the line pattern and greater than or equal to the second threshold value for pixels of the space; and a subprogram module for recognizing pixels of image B identified through the comparisons with both images A and C as defective pixels.

14. The computer readable recording medium of claim 12, wherein the line pattern is a metal interconnect pattern;

15. The computer readable recording medium of claim 12, wherein the computer program code unit further comprises a color variation correcting program module comprising:

a subprogram module for dividing images of the surface of the wafer having an X region having a first color value and a Y region having a second color into pixels having a predetermined size;

a subprogram module for determining a grey level value for each of the pixels;

a subprogram module for calculating the mean and standard deviation of the grey level values of the pixels in each of the X and Y regions; and a subprogram module for correcting the grey level value for each of the pixels in the X region such that the mean and standard deviation of the grey level values of the X region are equal to those of the Y region.

16. The computer readable recording medium of claim 15, wherein the subprogram module for correcting the grey level value for each of the pixels in the X region uses the following formula, such that the mean and standard deviation of the grey level values of the X region are equal to those of the Y region:

$$x'_i = \mu_Y + (x_i - \mu_X) \times \frac{\sigma_Y}{\sigma_X} \quad (1)$$

where $x_i$ is the grey level value for each of the pixels in the X region, $\mu$ is the mean grey level value of the pixels in corresponding regions, a is the standard deviation of grey level values for the pixels in corresponding regions, subscripts X and Y indicate X and Y regions, respectively, and $x'_i$ is the grey level value for each of the pixels in the X region after correction.

17. The computer readable recording medium of claim 15, wherein the program module for identifying pixels that have a grey level value greater than or equal to the first threshold value for pixels of the line pattern and the second threshold value for pixels of the space comprises:

a subprogram module for dividing images of the surface of the wafer into a plurality of pixels;

a subprogram module for extracting three successive images A, B, and C from the images of the surface of the wafer divided into pixels;

a subprogram module for comparing the pixels of image B with corresponding pixels of image A and calculating grey level differences between the corresponding pixels of images B and A;

a subprogram module for identifying pixels of image B that have a grey level difference, from the grey level value for the corresponding pixels of image A compared with image B, greater than or equal to the first threshold value for pixels of the line pattern and greater than or equal to the second threshold value for pixels of the space;

a subprogram module for comparing the pixels of image B with corresponding pixels of image C and calculating grey level differences between the corresponding pixels of images B and C;

a subprogram module for identifying pixels of image B that have a grey level difference, from the grey level value for the corresponding pixels of image C compared with image B, greater than or equal to the first threshold value for pixels of the line pattern and greater than or equal to the second threshold value for pixels of the space; and a subprogram module for recognizing pixels of image B identified through the comparisons with both images A and C as defective pixels.

18. The computer readable recording medium of claim 15, wherein the line pattern is a metal interconnect pattern;

* * * * *

UNITED STATES PATENT AND TRADEMARK OFFICE
CERTIFICATE OF CORRECTION

PATENT NO. : 7,027,638 B2
APPLICATION NO. : 09/949111
DATED : April 11, 2006
INVENTOR(S) : Chung-sam Jun et al.

It is certified that error appears in the above-identified patent and that said Letters Patent is hereby corrected as shown below:

At Column 9, Claim 8, Line 47, delete "," between "the" and "corresponding".

At Column 12, Claim 16, Line 17, delete "a" and insert -- σ --.

Signed and Sealed this

Fifth Day of September, 2006

JON W. DUDAS
*Director of the United States Patent and Trademark Office*